Jan. 31, 1967           F. H. O'NEIL           3,302,072
ELECTRICAL DEVICE WITH CASING SEAL MEMBERS
COMPRISING A CAVITY IN MEETING SURFACE
Filed July 26, 1963
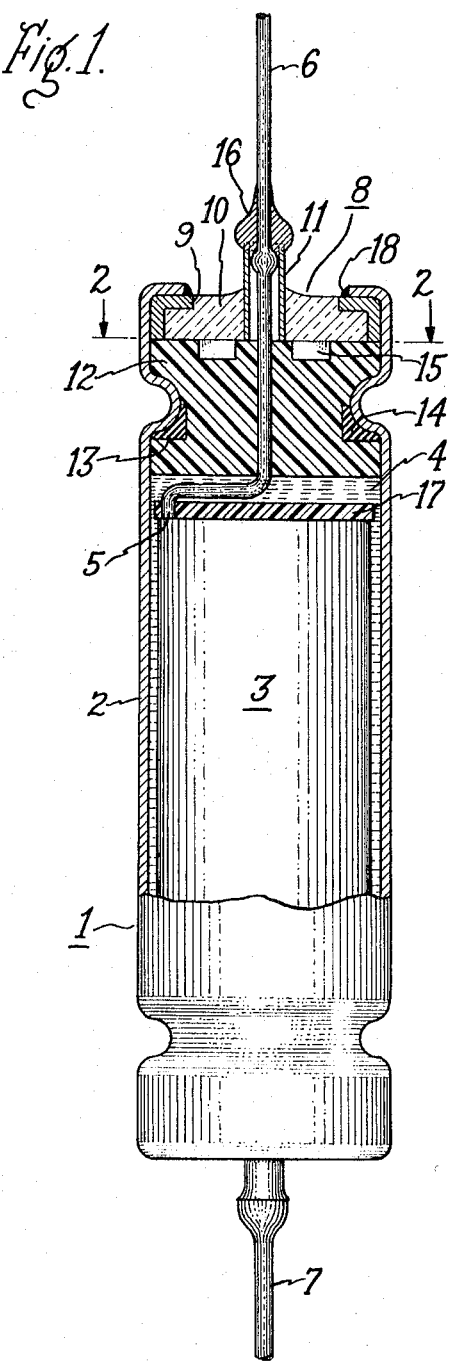
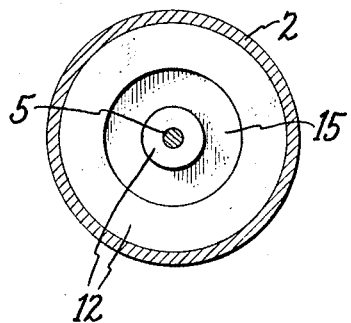
Inventor,
Franklin H. O'Neil,
by Sidney Greenberg
His Attorney

United States Patent Office 3,302,072
Patented Jan. 31, 1967

3,302,072
ELECTRICAL DEVICE WITH CASING SEAL MEMBERS COMPRISING A CAVITY IN MEETING SURFACE
Franklin H. O'Neil, Columbia, S.C., assignor to General Electric Company, a corporation of New York
Filed July 26, 1963, Ser. No. 297,830
8 Claims. (Cl. 317—230)

The present invention relates to seal structures and more particularly to a seal assembly for electrical devices such as electrolytic capacitors.

The effective sealing of electrolytic capacitors within a tight enclosure is essential to prevent loss of electrolyte as well as entrance of moisture, air and other contaminants, since such loss or contamination usually leads to variation and degradation of electrical properties of the unit, as well as premature breakdown.

Prior seal structures used for electrolytic capacitors have not in general provided entirely satisfactory results for various reasons. For example, certain of the prior seal structures have not adequately prevented escape of the electrolyte liquid or vapor emanating therefrom, while in those cases where such escape was effectively prevented, the buildup of vapor or gas pressure within the unit often resulted in ejection of the end seal.

It is an object of the invention to provide a seal structure for electrical devices, especially electrolytic capacitors and the like, which provides an effective and long lasting seal and avoids the disadvantages of the prior art structures of this type.

It is another object of the invention to provide a seal structure of the above type which is characterized by a strong, electrically insulating, hermetic seal preventing escape of the contained liquid or vapor, which has high mechanical strength to resist internal pressure, which forms an effective vapor barrier, and which is economically and readily produced.

It is a particular object of the invention to provide an improved seal structure incorporating a glass-to-metal seal component for hermetically sealing electrical devices, especially electrical capacitors.

Other objects and advantages will become apparent from the following description and the accompanying claims.

With the above objects in view, the present invention relates, in a preferred embodiment, to an electrolytic capacitor comprising a casing having an open end, a capacitor section within the casing, a terminal lead extending from the capacitor section outwardly through the open end, and a closure for the open end of the casing comprising a superposed assembly of an outer glass member and an inner electrical insulating member characterized by low vapor transmission and moisture absorption coupled with high resistance to chemical and thermal attack, the glass and insulating members having mutually contacting surfaces and the surface of the insulating member having at least one recess formed therein, and resilient sealing means arranged on the periphery of the electrically insulating member in sealing contact with the adjacent casing wall.

In a particularly preferred embodiment of the invention, the inner insulating member is composed of a chlorinated polyethylene synthetic resin material such as polytetrafluoroethylene, and the resilient sealing means is composed of a synthetic elastomer such as butyl rubber.

The invention will be better understood from the following description taken in conjunction with the accompanying drawing, in which:

FIGURE 1 is a partly sectional view of an electrolytic capacitor equipped with a seal structure of the present invention; and FIGURE 2 is a cross-sectional view of the FIGURE 1 device taken along the line 2—2.

Referring now to the drawing, there is shown an electrolytic capacitor 1 comprising a casing 2 preferably made of a solderable metal, such as silver-plated copper or aluminum having a solderable plating, containing a rolled capacitor section 3, conventionally made of a pair of convolutely wound, film-forming metal electrode foils, such as tantalum, aluminum or the like separated by paper or other suitable dielectric spacer material, the casing containing a liquid electrolyte 4 which impregnates capacitor roll section 3. Electrolyte 4 may be of any conventional or known type of capacitor electrolyte, as for example an aqueous ammonium pentaborate-glycol solution and it may be of liquid, gel, paste or other form. Tap lead wire 5 extending outwardly from one end of casing 2 is connected to one of the electrode foils of capacitor section 3, and a corresponding tap lead (not shown) connected to the other electrode foil extends outwardly from the opposite end. These leads, which normally are of film-forming metal such as tantalum, aluminum, or the like are connected at their outer ends to external leads 6 and 7 respectively, e.g., by welding.

In a usual construction, casing 2 is tubular with opposite open ends, each end being hermetically sealed by a seal assembly constructed in accordance with the invention. While the seal structure of only one end of the capacitor casing is shown and described, it will be understood that the opposite end has a corresponding seal structure.

It should also be understood that the described seal structures could be employed in types of capacitors other than those shown. For example, casing 2 could be of cup-shaped form with an anode of suitable type (such as a sintered slug or wound foil anode) inserted therein instead of capacitor section 3, the casing serving as the cathode and having a terminal lead soldered to its bottom end, all as well-known in the art.

In accordance with the invention an outer glass-to-metal seal structure 8 is arranged at the end of casing 2, comprising a metal retaining ring 9 having a glass seal 10 formed therein and a metal eyelet 11 passing axially through the glass seal for receiving tap lead 5. Retaining ring 9 and eyelet 11 are preferably made of solderable metal such as tin coated nickel-iron alloy, or the like. It will be understood that, if desired, non-solderable metals could be used for casing 2 and ring 9, in which case the parts are welded rather than soldered together. The glass seal structure 8 per se may be of known type of compression glass seals such as are presently commercially available.

It has been found that the use of such glass seals alone or in known combination with other seal components has not been effective in preventing appreciable loss of the contained electrolyte, due to its escape in liquid or vapor form or both, especially under conditions of widely varying temperature, and in the presence of certain electrolyte compositions which would tend to chemically attack the seal components.

In accordance with the invention, glass seal structure 8 is combined with an inner plug or bushing member 12 made of an electrically insulating material characterized by low vapor transmission, high resistance to severe chemical and thermal conditions, lack of moisture absorption, and high resistance to wetting by water and chemical solvents. A particularly preferred material for this purpose is polytetrafluoroethylene, known by the trademark Teflon. Other fluorocarbon plastics of this type having similar properties may also be used such as polytrifluorochloroethylene, known by the trademark Kel-F. The expression "fluorinated polyethylene" as used herein is intended to include within its meaning the above mentioned fluorocarbon synthetic resins as well as other halogen-substituted derivatives of polyethylene having similar characteristics.

The periphery of bushing member 12 is formed with an annular recess 13 for receiving O ring 14 made of an elastomeric material, which due to its highly resilient nature provides a constantly tight seal between casing 2 and bushing member 12. As shown, the wall of casing 2 is crimped against bushing member 12 in the region of O ring 14 to ensure a tight contact with the latter as well as to hold bushing member 12 in position.

A particularly preferred material for the O ring 14 is butyl rubber, but other elastomers of natural or synthetic nature may be employed, such as those produced by polymerization of butadiene alone or with styrene, e.g., Buna, Hycar; by polymerization of chloroprene, e.g., neoprene; and other rubber-substitute products known in the art. The expression "elastomer" as used herein is intended to include all such rubbery, highly resilient material.

As shown in FIGURE 1, the end of casing 2 is rolled over at its rim and soldered to retaining ring 9 to provide a joint 18. A solder seal 16 is provided at the upper end of eyelet 11 to complete the seal structure.

The surface of bushing member 12 in contact with glass disc 10 is provided, in accordance with a feature of the invention, with an annular groove 15, such that the interface between the two seal components is made discontinuous, as hereinafter explained.

Tap lead 5 passes axially through insulating bushing 12 into eyelet 11 of glass seal 8, where it is joined by welding to external lead 6, usually composed of a solderable metal, such as nickel, copper, or the like. Lead 6 is secured to the outer projecting end of eyelet 11 by soldered joint 16 which also seals off the interior of eyelet 11 from the atmosphere. Insulating disc 17 arranged at the end of capacitor roll 3 serves principally to keep tap lead 5, which passes through it, in proper position so as to prevent it from coming into contact with metal casing 2 and the end face of capacitor roll 3.

While groove 15 in the end surface of bushing member 12 is shown as annular, it may take other shapes if desired. There may instead be provided a plurality of independent recesses in the bushing surface. For the purposes of the invention, it is necessary only that one or more recesses be provided in the bushing contact surface to avoid an unbroken interface between bushing 12 and glass disc 10. It has been found that the provision of such recesses markedly improves the effectiveness of the seal structure. While the reason for the improvement thus afforded is not precisely known, a possible explanation is that the recesses avoid the formation of a capillary path between the outer glass and inner bushing components which might otherwise result in passage of electrolyte between lead 6 or eyelet 11 and casing 2, leading to high leakage currents or a short circuit failure of a unit. A further explanation is that by thus providing separated bushing end portions, such as the central and outer portions of bushing member 12, there is more assurance of a tight sealing engagement between the glass member 10 and inner insulating bushing 12. It appears that in the event the glass surface contacting the inner bushing is uneven, it may prevent the surface of the insulating bushing, which is usually relatively rigid, from fluid-tightly engaging the glass surface over an excessively large area if the bushing surface is continuous. By providing recesses in the latter surface resulting, in effect, in a plurality of surfaces each of which may independently engage the glass surface, there would be less likelihood of a poor sealing engagement between the parts as a whole.

In the provision of recesses in the surface of bushing member 12, care should be taken to leave a sealing contact surface in the central portion for closing off the inner end of eyelet 11. Such sealing is particularly important in preventing introduction of welding flux or other contaminants into the unit in the process of completing the seal structure.

In comparative tests made using units of the invention as compared to units of known commerically produced type having a seal comprising superposed Teflon and butyl rubber components, sample units of each type containing aqueous and non-aqueous electrolytes were tested under conditions of 85° C. and 125° C. In all cases, the units having seal structures of the invention showed remarkably little weight loss even after prolonged testing periods and considerably less than that suffered by the described commercial units. Thus, for example, in the test at 85° C. of units containing an organic non-aqueous electrolyte, after 2000 hours the commercial units exhibited a weight loss of about 90 milligrams, in contrast to a weight loss of only about 1 milligram for the unit sealed in accordance with the invention.

In a typical method of assembling the described seal structure, bushing member 12 with O ring 14 in groove 13 is placed within casing 2 with lead wire 5 passing through it, and the casing is crimped as shown in the drawing to secure bushing member 12 in place. Then external lead 6 is welded to lead wire 5. After the exposed face of the bushing member 12 is cleaned, the glass seal structure 8 is positioned into contact with the bushing seal surface and the end of the casing is rolled over to retain glass unit 8 in position. A soldered joint 18 is then made between ring 9 and casing 2. Finally, solder is flowed into eyelet 11 to form the seal between lead 6 and eyelet 11.

There is thus provided by the invention a seal structure which insures excellent retention of the fill electrolyte of the capacitor over long periods of time even under severe operational conditions and thus significantly contributes to maintaining the electrical properties of the capacitor substantially constant.

If desired, the seal structure described may be supplemented by the provision of a resilient O ring such as of butyl rubber lying within annular groove 15 and compressed, in the assembly of the parts, between the surface of glass member 10 and the bottom of groove 15.

Accordingly, while the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A closure for an open-ended container comprising a superposed assembly of an outer glass member with a sealed electrical terminal lead support therein and an electrical terminal lead passing therethrough and an inner insulating member characterized by low vapor transmission and moisture absorption and including high resistance to chemical and thermal attack, said members being coextensive with and sealed in the opening of the container and having mutually contacting surfaces, said mutually contacting surfaces formed with at least one recess surrounding the terminal lead and providing a broken interface area between said mutually contacting surfaces.

2. The closure recited in claim 1 wherein resilient sealing means are arranged about the periphery of said electrically insulating member in contact with the adjacent container wall.

3. The closure as recited in claim 1 wherein said inner insulating member is composed of fluorinated polyethylene.

4. A closure for an open-ended container comprising a superposed assembly of an outer glass member with a sealed electrical terminal lead support therein and an electrical terminal lead passing therethrough and an inner electrically insulating member characterized by low vapor transmission and moisture absorption and having high resistance to chemical and thermal attack, said members being coextensive with and sealed in the opening of the casing and having mutually contacting surfaces, said mutually contacting surfaces formed with at least one recess surrounding the terminal and providing a broken interface area between said mutually contacting surfaces, said inner member having a peripheral recess adjacent the wall of said casing, and resilient sealing means arranged in said peripheral recess of said insulating member in sealing engagement with the adjacent casing wall.

5. An electrical capacitor comprising, in combination, a casing containing an electrolyte, a capacitor component in said container immersed in said electrolyte, said casing having an opening therein and said capacitor component having a film-forming terminal lead extending through said opening, and a closure sealing the casing opening comprising a superposed assembly of an outer glass member having a sealed electrical terminal lead support therein and an inner electrically insulating member characterized by low vapor transmission and moisture absorption and having high resistance to chemical and thermal attack, said members being coextensive with and sealed in the opening of the container and having said terminal lead passing therethrough, said superposed members having mutually contacting surfaces formed with at least one recess surrounding the terminal lead and providing a broken interface area between said mutually contacting surfaces.

6. The electrical capacitor as recited in claim 5 wherein said terminal lead support comprises a metal eyelet passing through said glass member, and a solderable external lead member joined to said terminal lead within said eyelet, and solder material sealing the outer end of said metal eyelet.

7. The electrical capacitor as recited in claim 5 wherein resilient sealing means are arranged about the periphery of said electrically insulating member in sealing engagement with the adjacent casing wall.

8. The electrical capacitor as recited in claim 7 wherein said inner insulating member includes a peripheral recess adjacent the wall of said casing, said resilient sealing means being arranged in said peripheral recess of said electrically insulating member in sealing engagement with the adjacent casing wall, and said adjacent casing wall being crimped within said peripheral recess.

References Cited by the Examiner

UNITED STATES PATENTS

| 3,019,376 | 1/1962 | Kurland et al. | 317—230 |
| 3,131,337 | 4/1964 | Clement | 317—230 |
| 3,174,085 | 3/1965 | Schroeder | 317—230 |

FOREIGN PATENTS

| 411,858 | 6/1934 | Great Britain. |

JOHN W. HUCKERT, *Primary Examiner.*

J. D. KALLAM, *Assistant Examiner.*